US012686456B2

(12) United States Patent
Kuo

(10) Patent No.: US 12,686,456 B2
(45) Date of Patent: Jul. 21, 2026

(54) TELESCOPIC SEAT POST FOR BICYCLE

(71) Applicant: J.D COMPONENTS CO., LTD., Chang Hua Hsien (TW)

(72) Inventor: Nien-Teng Kuo, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 160 days.

(21) Appl. No.: 18/810,947

(22) Filed: Aug. 21, 2024

(65) Prior Publication Data

US 2025/0065971 A1 Feb. 27, 2025

(30) Foreign Application Priority Data

Aug. 25, 2023 (TW) ................................. 112209140

(51) Int. Cl.
*B62J 1/02* (2006.01)
*B62J 1/06* (2006.01)
*B62J 1/08* (2006.01)

(52) U.S. Cl.
CPC . *B62J 1/08* (2013.01); *B62J 1/02* (2013.01); *B62J 1/06* (2013.01); *B62J 2001/085* (2013.01)

(58) Field of Classification Search
CPC ......... B62J 1/02; B62J 1/06; B62J 1/08; B62J 2001/085
See application file for complete search history.

(56) References Cited

U.S. PATENT DOCUMENTS

| | | | | |
|---|---|---|---|---|
| 8,191,964 B2 * | 6/2012 | Hsu | ........................ | B62K 19/36 |
| | | | | 280/288.4 |
| 10,358,180 B2 * | 7/2019 | Shipman | .................... | B62J 1/08 |
| 10,562,578 B2 * | 2/2020 | Teixeira | ................. | B62K 19/36 |
| 10,752,307 B2 * | 8/2020 | Eberlberger | ........... | B62K 19/36 |
| 10,752,308 B2 * | 8/2020 | Eberlberger | .......... | B62K 19/36 |
| 10,807,667 B2 * | 10/2020 | Shipman | .................. | B62J 43/23 |
| 11,325,668 B2 * | 5/2022 | Liao | .......................... | B62J 1/06 |
| 11,535,324 B2 * | 12/2022 | Lin | ........................... | B62J 1/08 |
| 11,649,002 B2 * | 5/2023 | Shipman | ................... | B62J 1/08 |
| | | | | 297/215.13 |
| 11,738,817 B2 * | 8/2023 | Shipman | ................... | B62J 1/08 |
| | | | | 280/274 |
| 12,162,554 B2 * | 12/2024 | Shipman | ................... | B62J 1/08 |
| 12,187,372 B2 * | 1/2025 | Lin | ........................... | B62J 1/08 |
| 12,312,034 B2 * | 5/2025 | Shipman | .............. | G05D 7/0629 |
| 12,384,480 B2 * | 8/2025 | Hsu | ........................... | B62J 1/08 |

\* cited by examiner

*Primary Examiner* — Rodney B White
(74) *Attorney, Agent, or Firm* — MUNCY, GEISSLER, OLDS & LOWE, P.C.

(57) ABSTRACT

A telescopic seat post for a bicycle includes inner and outer tubes, a pneumatic cylinder inserted in the inner and outer tubes, and a closing set. The outer tube is provided at the bottom end thereof with an installation portion. The inner tube is telescopically inserted in the outer tube. The pneumatic cylinder is provided at the top end thereof with a control stem. The bottom end of the pneumatic cylinder is located in the installation portion. The closing set includes an elastic supporter and a rigid supporter. One of the elastic and rigid supporters is removably installed in the installation portion to provide an upward supporting force to the pneumatic cylinder. As a result, the telescopic seat post is selectable between having shock absorption effect and having no shock absorption effect by the rider through component replacement, and the component installation and replacement is easy.

20 Claims, 9 Drawing Sheets

TELESCOPIC SEAT POST FOR BICYCLE

BACKGROUND OF THE INVENTION

1. Field of the Invention

The present invention relates to telescopic seat posts of bicycles and more particularly, to a telescopic seat post which is selectable between having shock absorption effect and having no shock absorption effect through component replacement.

2. Description of the Related Art

The current telescopic seat posts are usually installed under bicycle saddles so that the rider can adjust the length of the telescopic seat post according to requirements, so as to adjust the height of the saddle for the optimum riding posture. For enabling the length adjustment of the telescopic seat post, the telescopic seat post is installed therein with a pneumatic cylinder connected with the saddle. By the operation of a control member such as a wire control device, the pneumatic cylinder is actuated to lengthen or shorten so as to drive the telescopic seat post to lengthen or shorten, so that the objective of the height adjustment for the saddle is attained. However, when sitting on the saddle, the rider will sense the vibration of the bicycle and thereby feel uncomfortable. Therefore, the current telescopic seat posts may be installed with a cushion between the saddle and the top end of the inner tube so that when the rider sits on the saddle, the cushion provides an upward supporting force to the saddle, which reduces the uncomfortableness resulted from the vibration of the bicycle, thereby attaining shock absorption effect.

It can be known from the above description that the current telescopic seat posts can be roughly divided into two types, including the type with shock absorption effect and the type without shock absorption effect. However, a same telescopic seat post is not selectable between having shock absorption effect and having no shock absorption effect by the rider through component replacement. Besides, as for the telescopic seat post having shock absorption effect, because the cushion is installed between the saddle and the top end of the inner tube, the saddle has to be detached before the replacement or maintenance for the cushion. After the replacement or maintenance for the cushion is accomplished, the saddle has to be reinstalled. Therefore, the replacement or maintenance for the cushion is relatively uneasy, so that the current telescopic seat posts still need structural improvement.

SUMMARY OF THE INVENTION

The present invention has been accomplished in view of the above-noted circumstances. It is a primary objective of the present invention to provide a telescopic seat post for a bicycle, which provides a component having shock absorption effect and another component having no shock absorption effect, thereby selectable between having shock absorption effect and having no shock absorption effect by the rider through replacement between the components, and the installation and replacement for the components is relatively easy.

To attain the above primary objective, the present invention provides a telescopic seat post which includes an outer tube, an inner tube, a pneumatic cylinder, and a closing set. The outer tube is provided at the bottom end thereof with an installation portion. The inner tube is inserted in the outer tube telescopically relative to the outer tube. The pneumatic cylinder is inserted in the inner and outer tubes. The pneumatic cylinder is provided at the top end thereof with a control stem. The bottom end of the pneumatic cylinder is located in the installation portion. The closing set includes an elastic supporter and a rigid supporter. One of the elastic supporter and the rigid supporter is removably installed in the installation portion to provide an upward supporting force to the pneumatic cylinder.

By the above-described technical features, the telescopic seat post of the present invention is selectable between having shock absorption effect and having no shock absorption effect by the rider through replacement between the elastic supporter and the rigid supporter for satisfying riding requirements. Besides, the closing set is installed in the installation portion of the outer tube, that is relatively more convenient and easier in assembly and replacement for the rider, thereby increasing usage convenience.

Preferably, the pneumatic cylinder has a cylinder body, a piston rod telescopic relative to the cylinder body, and the control stem. The control stem is located at one of the cylinder body and the piston rod.

Preferably, the installation portion has an accommodating space. The closing set includes a positioning member installed in the accommodating space and fastened to the bottom end of the pneumatic cylinder, and a cover closing up a bottom end opening of the installation portion. One of the elastic supporter and the rigid supporter is removably installed between the positioning member and the cover.

Preferably, the elastic supporter is a compressible elastomer. An end of the elastomer is abutted against the positioning member. Another end of the elastomer is abutted against the cover.

Preferably, the cover is screwingly engaged with the installation portion in a way that the elastomer is applied with a preload by the cover screwingly engaged with the installation portion for a depth.

Preferably, the elastic supporter includes a compressible elastomer, and a gas filled in the elastomer. An end of the elastomer is abutted against the positioning member. Another end of the elastomer is abutted against the cover.

Preferably, the closing set includes a nozzle installed on the cover. The nozzle communicates with the gas in the elastomer.

Preferably, the installation portion has an accommodating space. The closing set includes a positioning member installed in the accommodating space and fastened to the bottom end of the pneumatic cylinder, and a cover closing up a bottom end opening of the installation portion. A gas is filled between the positioning member and the cover to become the elastic supporter.

Preferably, the installation portion has an accommodating space. The closing set includes a positioning member installed in the accommodating space and fastened to the bottom end of the pneumatic cylinder. The rigid supporter has a body portion, and a bottom portion connected with the body portion. A bottom end opening of the installation portion is closed up by the bottom portion.

Preferably, the outer tube has a tube body. The tube body is formed at the bottom end thereof with the installation portion. The inner wall surface of the installation portion has a first stair portion. The positioning member has a positioning stair portion. The positioning stair portion is abutted against the first stair portion.

Preferably, the inner wall surface of the outer tube has an embedding recess. The positioning member has an embedding protrusion. The embedding protrusion is embedded in the embedding recess.

Preferably, the outer tube has a tube body, and a coupling pipe removably sleeved onto and fastened to the bottom end of the tube body to become the installation portion. The inner wall surface of the installation portion has a second stair portion. The positioning member has a positioning stair portion. The positioning stair portion is abutted against the second stair portion.

Preferably, the closing set has a fastener. The fastener is fastened between the bottom end of the pneumatic cylinder and the positioning member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The telescopic seat post provided by the present invention will be further described in the embodiments given herein below and the accompanying drawings, and wherein.

DETAILED DESCRIPTION OF THE INVENTION

Figure 1:
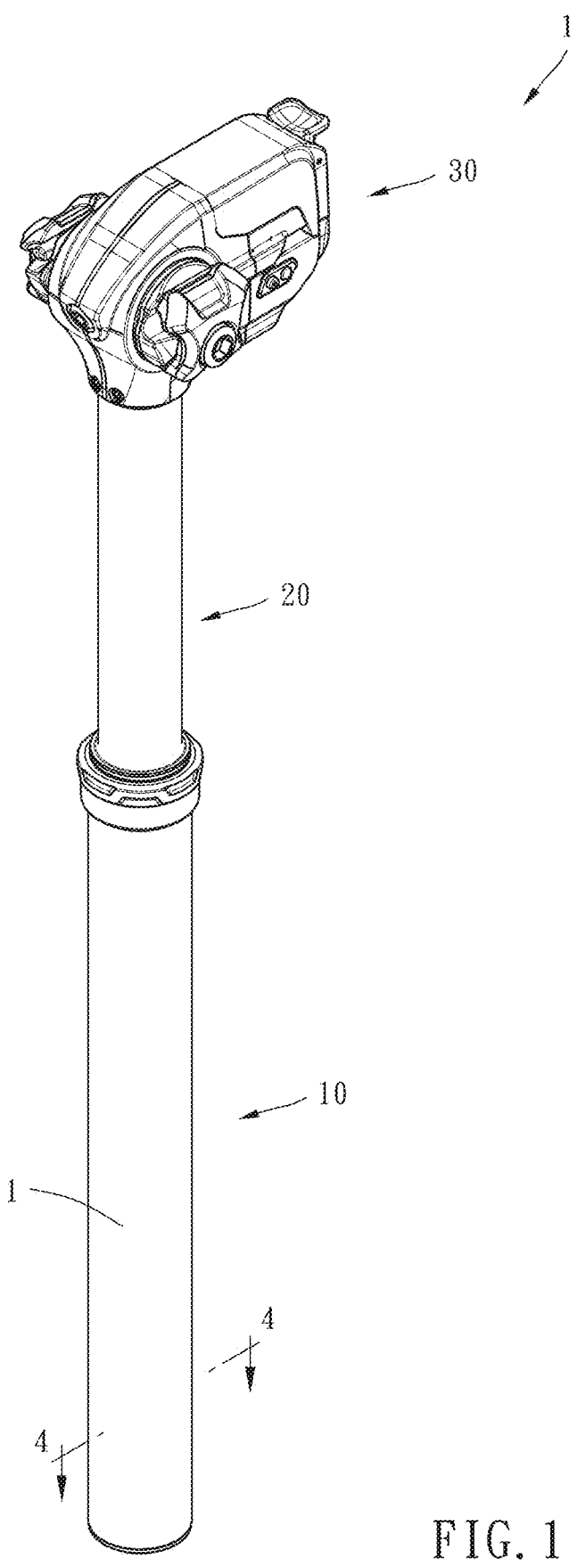
FIG. 1 is an assembled perspective view of a telescopic seat post of a first embodiment of the present invention.

First of all, it is to be mentioned that throughout this specification, including the following embodiments and claims, the directional terms are all based on the direction shown in the figures. Besides, same reference numerals used in the following embodiments and the appendix drawings designate same or similar elements or the structural features thereof.

Figure 2:
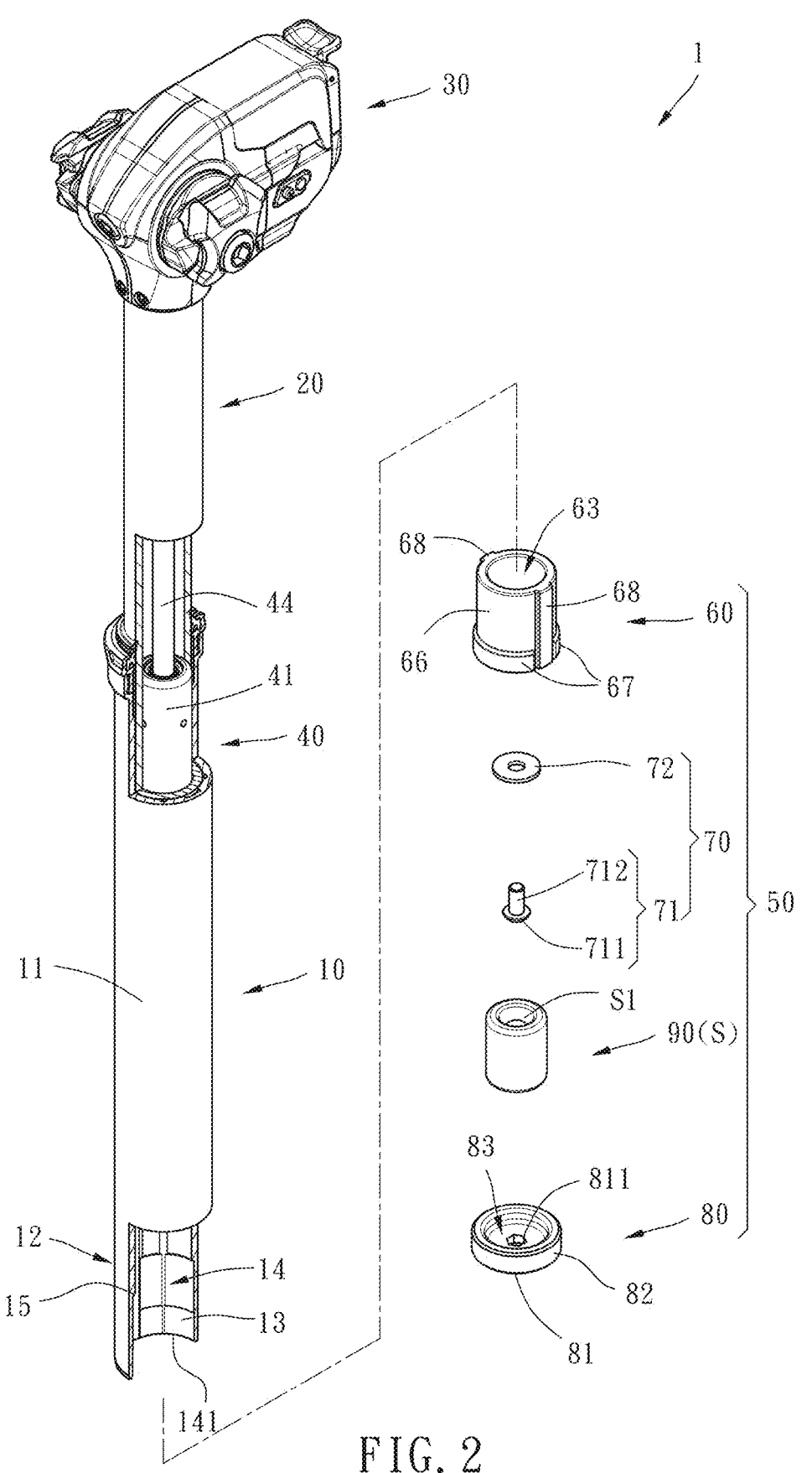
FIG. 2 is a partially cut-off exploded view of FIG. 1.
Figure 3:
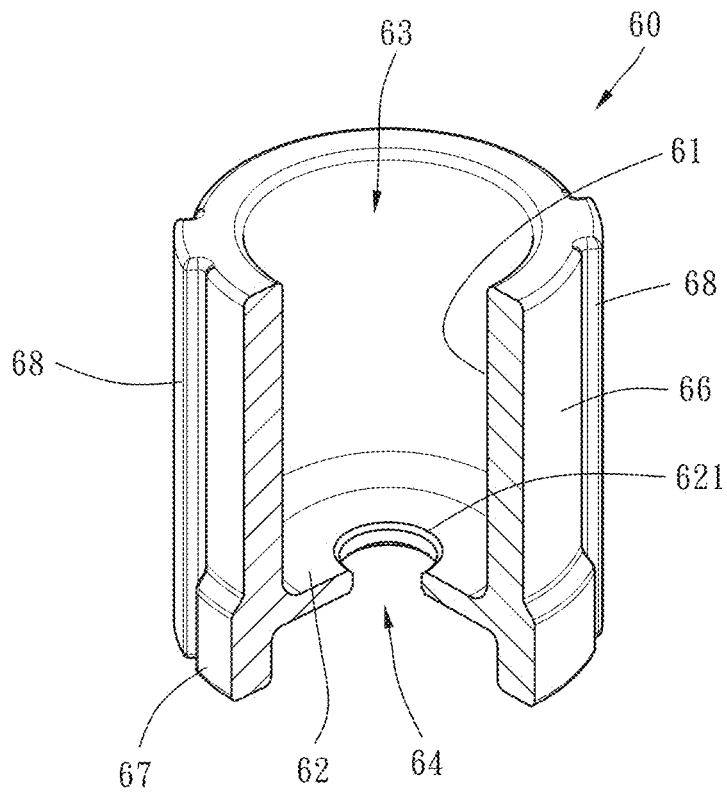
FIG. 3 is a partially cut-off perspective view of a positioning member of the telescopic seat post of the first embodiment of the present invention.

As shown in FIG. 1 to FIG. 2, a telescopic seat post 1 of a first embodiment of the present invention includes an outer tube 10, an inner tube 20, a seat post head 30, a pneumatic cylinder 40, and a closing set 50.

Figure 4:
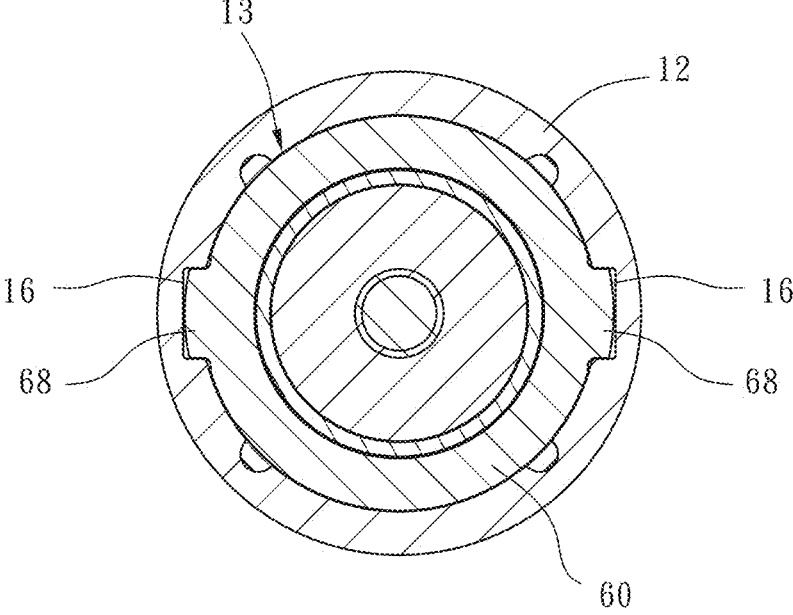
FIG. 4 is a sectional view taken along the line 4-4 in FIG. 1.

The outer tube 10 has a tube body 11. The tube body 11 is formed at the bottom end thereof with an installation portion 12. The installation portion 12 has an inner wall surface 13, and an accommodating space 14 formed by the inner wall surface 13 in a surrounding manner. The accommodating space 14 has a bottom end opening 141. The inner wall surface 13 of the installation portion 12 has a first stair portion 15 protruding along the radial direction of the tube body 11, and two embedding recesses 16 (as shown in FIG. 4) recessed along the radial direction of the tube body 11.

The inner tube 20 is inserted in the outer tube 10, and the inner tube 20 is telescopic relative to the outer tube 10.

The top end of the seat post head 30 is connected to a bicycle saddle (not shown). The bottom end of the seat post head 30 is inserted into the top end of the inner tube 20, as shown in FIG. 5.

The pneumatic cylinder 40 has a cylinder body 41, a piston rod 44, and a control stem 45. As shown in FIG. 5 and FIG. 6, the cylinder body 41 is inserted in the outer tube 10 and the inner tube 20. The bottom end of the cylinder body 41, i.e. the bottom end of the pneumatic cylinder 40, is located in the installation portion 12 of the outer tube 10. The cylinder body 41 is provided therein and at the bottom end thereof with a blocking member 42. The blocking member 42 has a threaded hole 43. The piston rod 44 is inserted in the inner tube 20, and telescopic relative to the cylinder body 41. The control stem 45 is located at the top end of the piston rod 44, i.e. the top end of the pneumatic cylinder 40. The control stem 45 is located at the top end of the inner tube 20, and inserted into the seat post head 30.

The closing set 50 includes a positioning member 60, a fastener 70, a cover 80, and an elastic supporter 90.

Figures 5, 6:
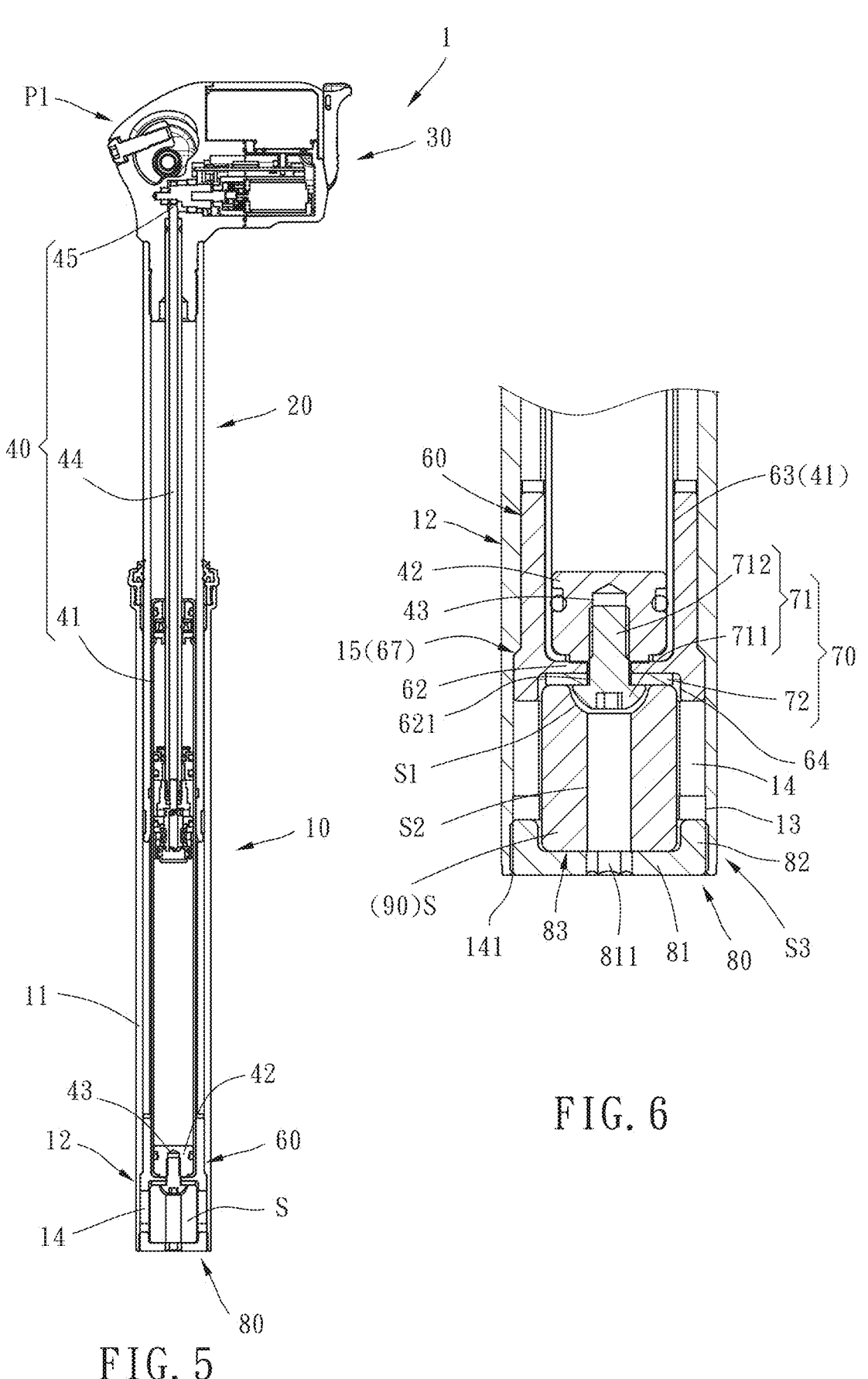
FIG. 5 is an axially sectional view of the telescopic seat post of the first embodiment of the present invention, showing the status that a seat post head is not moved downwardly yet.
FIG. 6 is an enlarged view of a part of FIG. 5, showing the status that an elastic supporter is not compressed yet.

As shown in FIG. 2 to FIG. 6, the positioning member 60 has an inner wall surface 61, a partition plate 62 protruding from the inner wall surface 61 radially, a cylinder body accommodating recess 63 formed by the inner wall surface 61 in a surrounding manner and located above the partition plate 62, and a positioning recess 64 formed by the inner wall surface 61 in a surrounding manner and located below the partition plate 62. The partition plate 62 has a threaded hole 621 communicating with the cylinder body accommodating recess 63 and the positioning recess 64. The positioning member 60 has an outer wall surface 66 opposite to the inner wall surface 61, two positioning stair portions 67 protruding from the outer wall surface 66 radially, and two embedding protrusion 68 protruding from the outer wall surface 66 radially. The embedding protrusions 68 are separately located between the positioning stair portions 67. In practical assembly, the bottom end of the cylinder body 41 of the pneumatic cylinder 40 is inserted into the cylinder body accommodating recess 63 of the positioning member 60 in a way that the embedding protrusions 68 of the positioning member 60 are embedded in the embedding recesses 16 (as shown in FIG. 4) of the installation portion 12 respectively and the positioning stair portions 67 of the positioning member 60 are abutted against the first stair portions 15 of the installation portion 12 (as shown in FIG. 6). As a result, by the cooperation of the embedding protrusions 68 and the embedding recesses 16, the positioning member 60 is slidable vertically along the axial direction of the tube body 11, but disabled from rotation relative to the tube body 11.

The fastener 70 includes a screw 71 and a washer 72. The screw 71 has a head portion 711, and a threaded portion 712 connected with the head portion 711. In practical assembly, the threaded portion 712 of the screw 71 is screwed into the threaded hole 621 of the positioning member 60 and the threaded hole 43 of the blocking member 42, and two sides of the washer 72 are abutted on the partition plate 62 of the positioning member 60 and the head portion 711 of the screw 71 respectively, so that the positioning member 60 and the bottom end of the cylinder body 41 of the pneumatic cylinder 40 are fastened to each other.

The cover 80 has a bottom portion 81, an annular portion 82 extending upwardly from the bottom portion 81, and a placement recess 83 formed by the bottom portion 81 and the annular portion 82 collectively. The bottom portion 81 is provided therethrough with an adjustment hole 811. In practical assembly, the annular portion 82 of the cover 80 is screwingly engaged with the inner wall surface 13 of the installation portion 12, so that the bottom end opening 141 of the installation portion 12 is closed up.

The elastic supporter 90 in this embodiment is a compressible elastomer S. The material of the elastomer S may be rubber, foam, polyurethane, and so on. The elastomer S has a fixture recess S1, and a communicating recess S2 communicating with the fixture recess S1. The upper end of the elastomer S is accommodated in the positioning recess 64 of the positioning member 60, and indirectly abutted against the positioning member 60 through the washer 72. Meanwhile, the head portion 711 of the screw 71 is accommodated in the fixture recess S1. The lower end of the elastomer S is accommodated in the placement recess 83 of the cover 80, and abutted against the bottom portion 81 of the cover 80, so that the elastomer S provides an upward supporting force to the positioning member 60 and the pneumatic cylinder 40. The elastomer S designed with the communicating recess S2 is relatively easier to be compressed and deformed by an external force.

The structural features of the telescopic seat post 1 of the first embodiment of the present invention are described above. The usage manner and effects of the telescopic seat post 1 of the first embodiment of the present invention will be further introduced herein below.

In practical operation, at first, the rider adjusts the telescopic seat post 1 of the first embodiment of the present invention to the height appropriate for riding, and inserts a tool, such as a hex wrench, into the adjustment hole 811 of the cover 80 to rotate the cover 80, so as to adjust the depth, for which the cover 80 is screwingly engaged with the installation portion 12. At this moment, the bottom portion 81 of the cover 80 is upwardly abutted against the lower end of the elastomer S, and applies the elastomer S a preload. The magnitude of the preload can be adjusted according to the requirement of the rider.

Figures 7, 8:
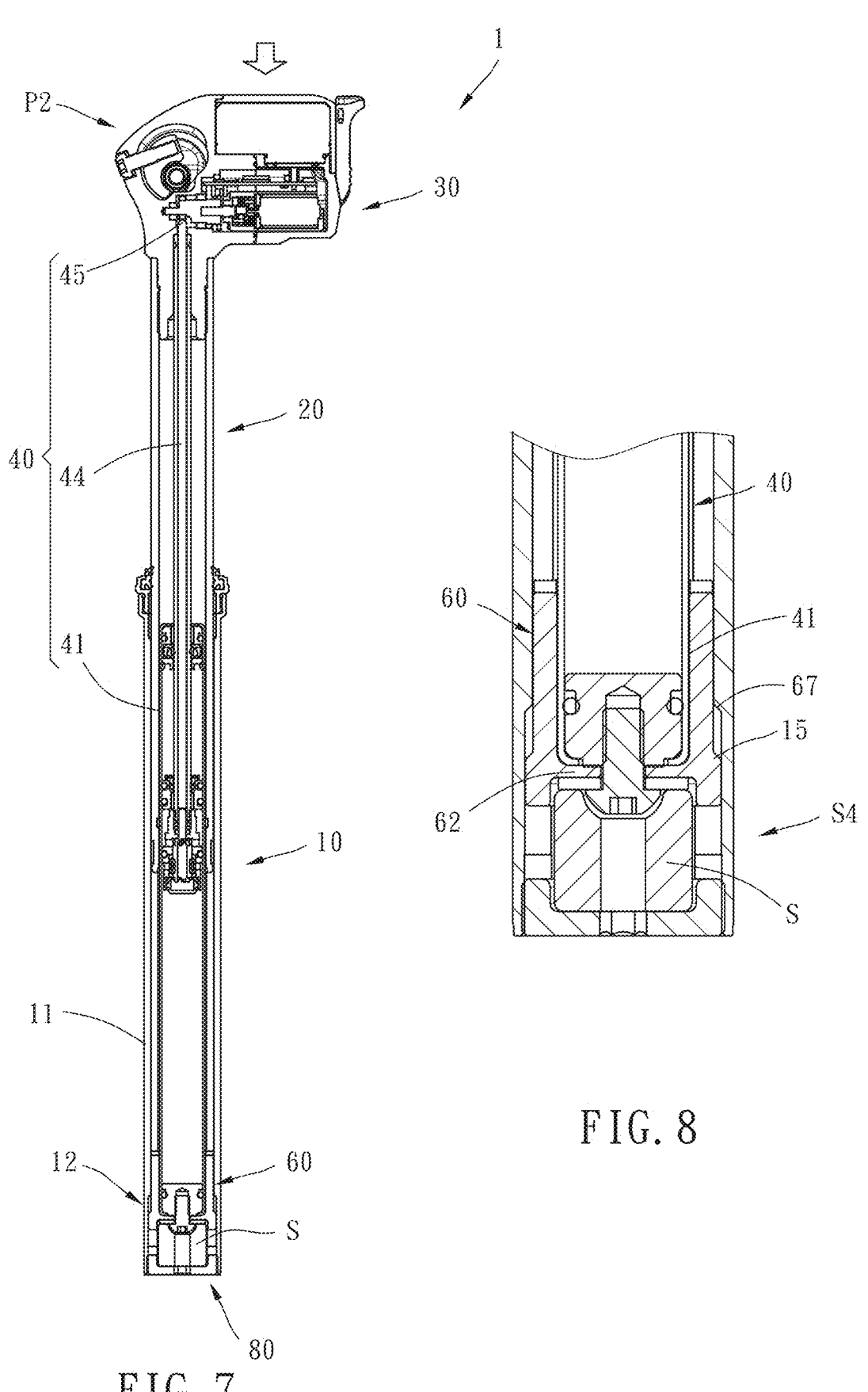
FIG. 7 is another axially sectional view of the telescopic seat post of the first embodiment of the present invention, showing the status that the seat post head is moved downwardly.
FIG. 8 is an enlarged view of a part of FIG. 7, showing the status that the elastic supporter is compressed.

When sitting on the bicycle saddle, the rider will apply a downward pressing force to the seat post head 30, making the seat post head 30 moved downwardly from the position P1 as shown in FIG. 5 to the position P2 as shown in FIG. 7. The seat post head 30 is pressed downwardly on the inner tube 20 and the control stem 45 of the pneumatic cylinder 40, making the inner tube 20 and the piston rod 44 of the pneumatic cylinder 40 drive the cylinder body 41 of the pneumatic cylinder 40 and the positioning member 60 to move downwardly together, thereby pressing the partition plate 62 of the positioning member 60 downwardly on the upper end of the elastomer S. That makes the elastomer S compressed to change from the initial status S3 as shown in FIG. 6 into the compressed status S4 as shown in FIG. 8. At this moment, the elastomer S stores an upward supporting force and thereby abutted against the partition plate 62 of the positioning member 60, so as to counteract the downward pressing force from the bicycle saddle. In other words, when the rider sits on the bicycle saddle, the elastomer S can reduce the uncomfortableness resulted from the vibration of the bicycle, thereby attaining shock absorption effect.

Once the rider leaves the bicycle saddle, which means the rider no longer applies the downward pressing force to the bicycle saddle, the elastomer S will restore from the compressed status S4 as shown in FIG. 8 to the initial status S3 as shown in FIG. 6. Meanwhile, the supporting force released from the elastomer S will act on the partition plate 62 of the positioning member 60, making the positioning stair portions 67 of the positioning member 60 abutted against the first stair portions 15 of the installation portion 12 to limit the position of the upwardly moved positioning member 60, and making the partition plate 62 of the positioning member 60 push the bottom end of the cylinder body 41 of the pneumatic cylinder 40 as shown in FIG. 7 so that the pneumatic cylinder 40, the inner tube 20 and the seat post head 30 are upwardly moved together. That makes the seat post head 30 moved from the position P2 as shown in FIG. 7 back to the position P1 as shown in FIG. 5.

As shown in FIG. 6, if the elastomer S of the telescopic seat post 1 of the present invention needs replacement or maintenance, the cover 80 can be detached from the bottom end opening 141 of the installation portion 12, and then the elastomer S can be taken out from the accommodating space 14 of the installation portion 12. After a new elastomer S is installed, the cover 80 can be reinstalled to the bottom end opening 141 of the installation portion 12. Therefore, the telescopic seat post 1 of the present invention is relatively easy in replacement and maintenance for the elastomer S.

Figure 9:
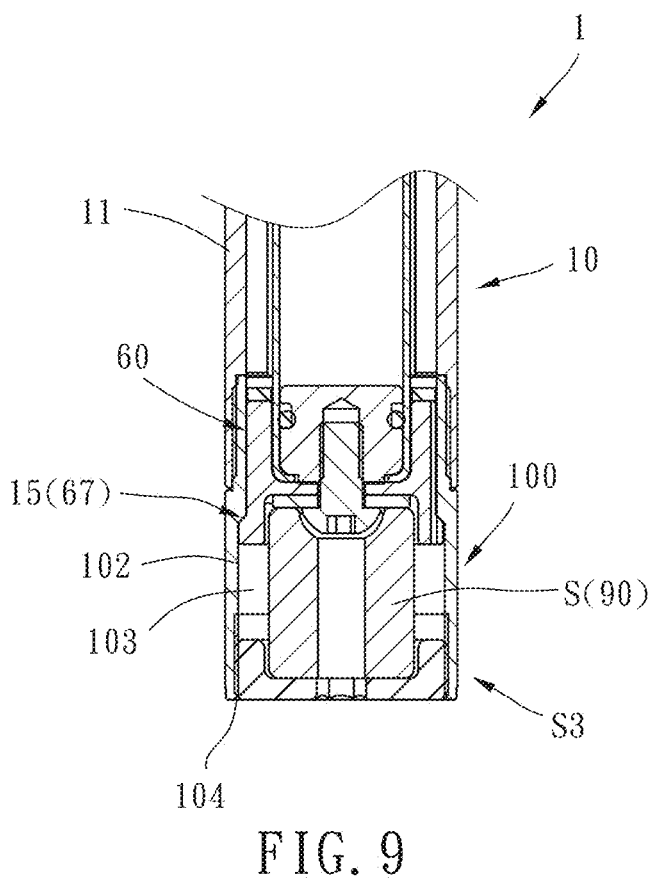
FIG. 9 is an axially sectional view of a part of another kind of telescopic seat post provided by the first embodiment of the present invention, showing the status that the elastic supporter is not compressed yet.
Figure 10:
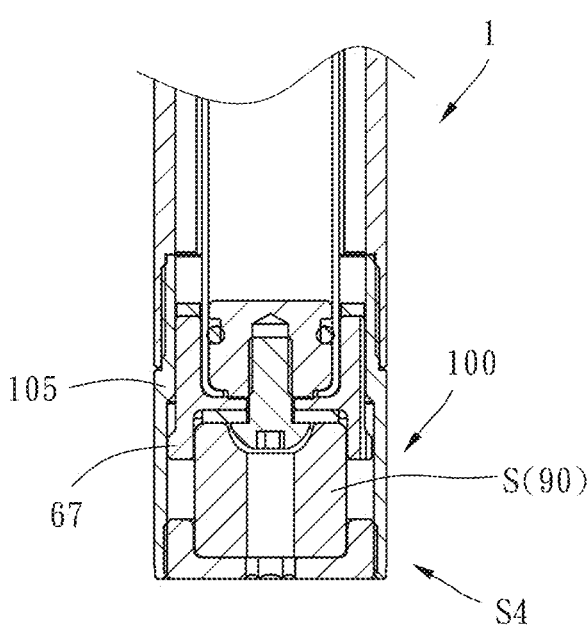
FIG. 10 is similar to FIG. 9, but showing the status that the elastic supporter is compressed.

Besides, the telescopic seat post 1 of the first embodiment of the present invention can be provided as different types for the rider to choose. As shown in FIG. 9 and FIG. 10, the outer tube 10 has a coupling pipe 100 removably inserted into the bottom end of the tube body 11, so that the coupling pipe 100 becomes an installation portion. The coupling pipe 100 (installation portion) has an inner wall surface 102, and an accommodating space 103 formed by the inner wall surface 102 in a surrounding manner. The accommodating space 103 has a bottom end opening 104. The inner wall surface 102 of the coupling pipe 100 (installation portion) has a second stair portion 105 protruding along the radial direction of the tube body 11. In practical assembly, the positioning member 60 is installed in the accommodating space 103, and the bottom end opening 104 is closed up by the cover 80. When the compressed elastomer S restores from the compressed status S4 as shown in FIG. 10 to the initial status S3 as shown in FIG. 9, the positioning stair portions 67 of the positioning member 60 will be abutted against the second stair portion 105 of the coupling pipe 100

(installation portion) to limit the position of the upwardly moved positioning member 60.

However, the present invention is unlimited to the embodiment. Because the elastic supporter 90 (elastomer S) as shown in FIG. 6 is removably installed between the positioning member 60 and the cover 80, it can be replaced by different types of elastic supporter.

Figure 11:
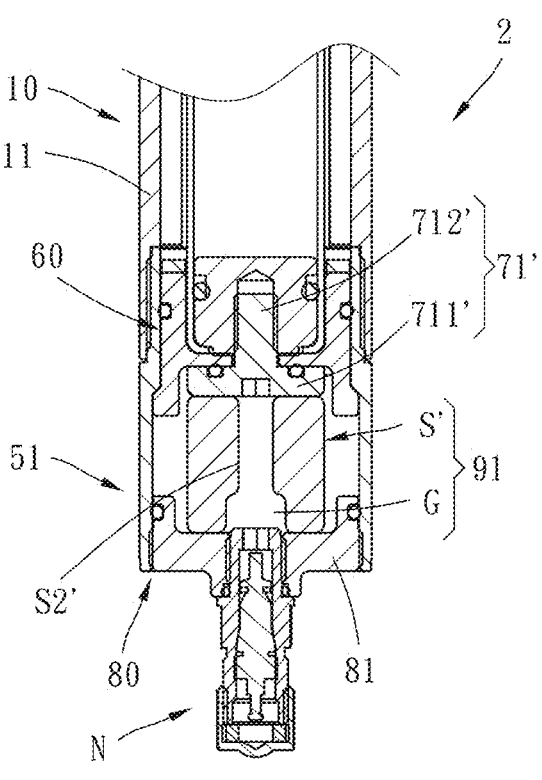
FIG. 11 is an axially sectional view of a part of a telescopic seat post of a second embodiment of the present invention.

Referring to FIG. 11, a telescopic seat post 2 of a second embodiment of the present invention is approximately the same in structure with the first embodiment, but the primary difference lies in that a different closing set 51 is provided in this embodiment. The closing set 51 in this embodiment has an above-described positioning member 60, a fastener 71', an elastic supporter 91, and an above-described cover 80. The fastener 71' is a relatively larger screw. The fastener 71' (screw) has a head portion 711' and a threaded portion 712'. The elastic supporter 91 includes a compressible elastomer S' and a gas G. The upper end of the elastomer S' is indirectly abutted against the positioning member 60 through the head portion 711' of the fastener 71' (screw). The lower end of the elastomer S' is abutted against the bottom portion 81 of the cover 80, and the elastomer S' has a communicating recess S2' penetrating through upper and lower ends of the elastomer S'. The gas G is filled in the communicating recess S2' of the elastomer S'. Besides, the closing set 51 includes a nozzle N installed on the bottom portion 81 of the cover 80. The nozzle N communicates with the gas G in the elastomer S'. The gas pressure of the gas G can be adjusted with the nozzle N, so that the preload of the elastic supporter 91 can be adjusted to satisfy different usage requirements.

Figure 12:
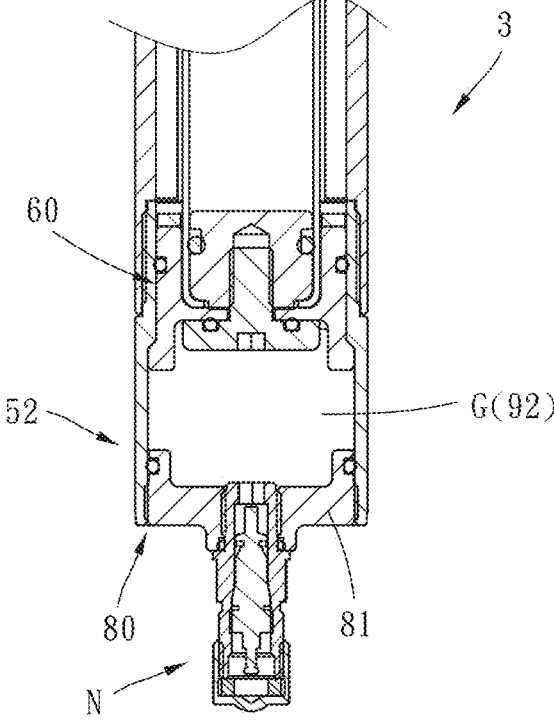
FIG. 12 is an axially sectional view of a part of a telescopic seat post of a third embodiment of the present invention.

Referring to FIG. 12, a telescopic seat post 3 of a third embodiment of the present invention is approximately the same in structure with the second embodiment, but the primary difference lies in that a different closing set 52 is provided in this embodiment. The closing set 52 in this embodiment includes a nozzle N installed on the bottom portion 81 of the cover 80, and a gas G is filled between the positioning member 60 and cover 80 to become an elastic supporter 92. The gas pressure of the gas G can be adjusted with the nozzle N, so that the preload of the elastic supporter 92 can be adjusted to satisfy different usage requirements.

Figure 13:
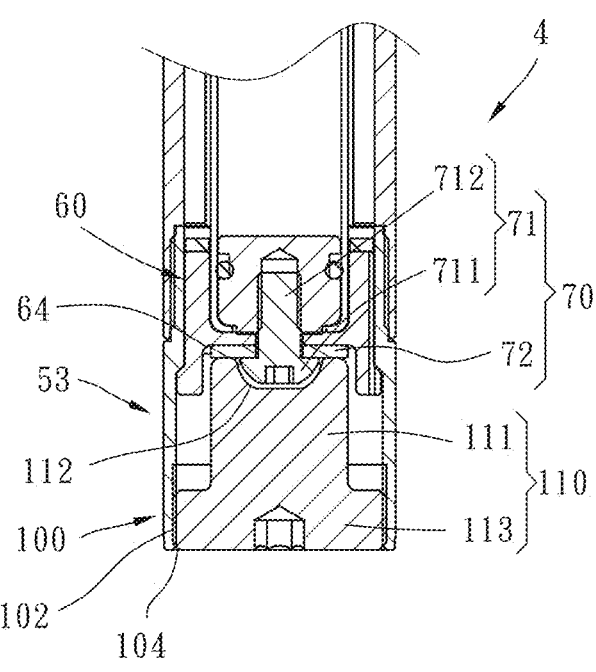
FIG. 13 is an axially sectional view of a part of a telescopic seat post of a fourth embodiment of the present invention.
Figure 14:
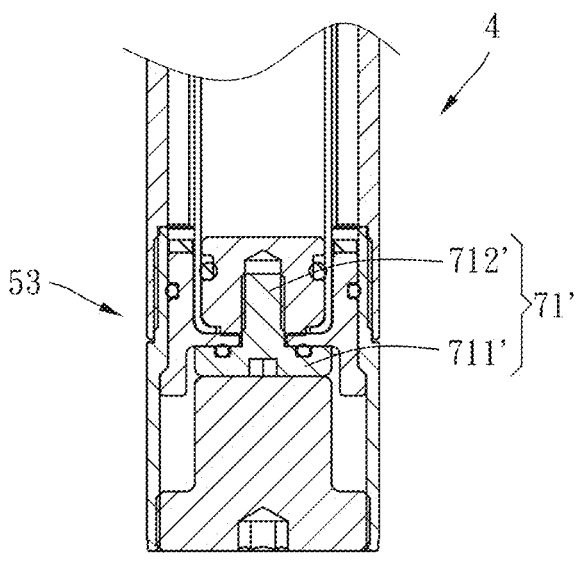
FIG. 14 is similar to FIG. 13, but showing a different kind of fastener.

Referring to FIG. 13, a telescopic seat post 4 of a fourth embodiment of the present invention is different in structure from the first, second and third embodiments, and the primary difference lies in that a different closing set 53 is provided in this embodiment. The closing set 53 in this embodiment not only includes an above-described positioning member 60 and an above-described fastener 70, but also includes a rigid supporter 110. The rigid supporter 110 has a body portion 111, and a bottom portion 113 connected with the body portion 111. The body portion 111 has a fixture recess 112. The body portion 111 of the rigid supporter 110 is accommodated in the positioning recess 64 of the positioning member 60, and indirectly abutted against the positioning member 60 through the washer 72. Meanwhile, the head portion 711 of the screw 71 is accommodated in the fixture recess 112. The bottom portion 113 of the rigid supporter 110 is screwingly engaged with the inner wall surface 102 of the coupling pipe 100 (installation portion), so as to close up the bottom end opening 104 of the coupling pipe 100 (installation portion). It should be additionally mentioned here that compared with the above-described elastic supporters 90, 91, 92, the rigid supporter 110 is relatively lower in compressibility, so the rigid supporter 110 has no shock absorption effect. In other words, if the rider doesn't need the telescopic seat post 4 having shock absorption effect, the above-described elastic supporters 90 can be replaced by the rigid supporter 110. Besides, the fastener 71' (screw) as shown in FIG. 14 can be used in this embodiment.

Figure 15:
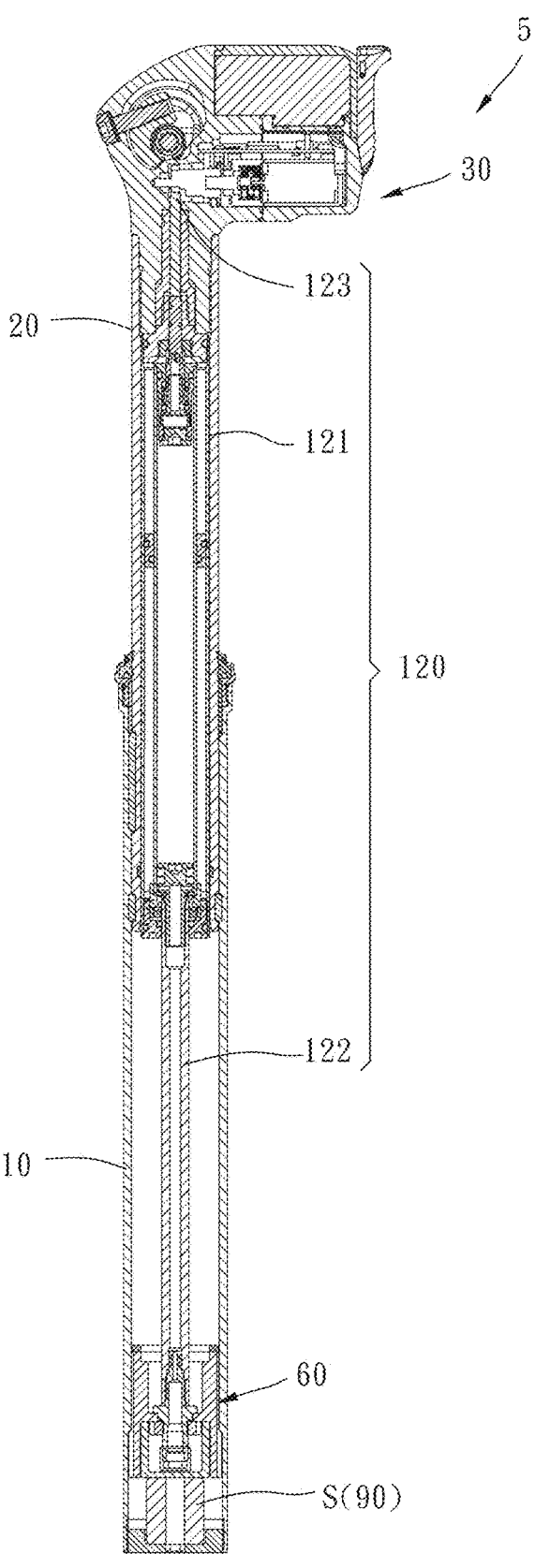
FIG. 15 is an axially sectional view of a telescopic seat post of a fifth embodiment of the present invention.

However, the telescopic seat posts 1, 2, 3, 4 are unlimited to those disclosed in the embodiment. Referring to FIG. 15, a telescopic seat post 5 of a fifth embodiment of the present invention is approximately the same in structure with the first embodiment, but the primary difference therebetween lies in that this embodiment provides another kind of pneumatic cylinder 120. The pneumatic cylinder 120 has a cylinder body 121, a piston rod 122, and a control stem 123. The cylinder body 121 is inserted in the outer tube and the inner tube 20. The piston rod 122 is disposed at the bottom end of the cylinder body 121, thereby located at the bottom end of the pneumatic cylinder 120. The piston rod 122 is telescopic relative to the cylinder body 121. The control stem 123 is disposed 10 at the top end of the cylinder body 121, thereby located at the top end of the pneumatic cylinder 120. The control stem 123 is located at the top end of the inner tube 20, and inserted into the seat post head 30. In this way, when sitting on the bicycle saddle, the rider applies a downward pressing force to the seat post head 30. The seat post head 30 is downwardly pressed on the inner tube 20 and the pneumatic cylinder 120, making the inner tube 20, the pneumatic cylinder 120 and the positioning member 60 downwardly moved together. That makes the positioning member 60 downwardly pressed on the elastic supporter 90 (elastomer S), so that the elastic supporter 90 (elastomer S) is compressed to store an upward supporting force and thereby abutted against the positioning member 60, so as to counteract the downward pressing force from the bicycle saddle to attain shock absorption effect. Besides, the user can replace the elastic supporter 90 by the elastic supporter 91, 92 or the rigid supporter 110 to satisfy different usage requirements.

In summary, the telescopic seat post 1, 2, 3, 4, 5 of the present invention is selectable between having shock absorption effect and having no shock absorption effect through replacement between the elastic supporter 90, 91, 92 and the rigid supporter 110. Besides, the closing set 50, 51, 52, 53 is installed in the installation portion 12, 100 of the outer tube 10, so the rider has no need to detach and reinstall the saddle during the installation or replacement of the elastic supporter 90, 91, 92 or the rigid supporter 110, so the replacement and maintenance is relatively more convenient and easier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A telescopic seat post for a bicycle, the telescopic seat post comprising:

an outer tube, the outer tube being provided at a bottom end thereof with an installation portion;

an inner tube inserted in the outer tube telescopically relative to the outer tube;

a pneumatic cylinder inserted in the inner and outer tubes, the pneumatic cylinder being provided at a top end thereof with a control stem, a bottom end of the pneumatic cylinder being located in the installation portion; and a closing set comprising:

an elastic supporter; and a rigid supporter;

wherein one of the elastic supporter and the rigid supporter is removably installed in the installation portion to provide an upward supporting force to the pneumatic cylinder.

2. The telescopic seat post as claimed in claim 1, wherein the pneumatic cylinder has a cylinder body, a piston rod telescopic relative to the cylinder body, and the control stem; the control stem is located at one of the cylinder body and the piston rod.

3. The telescopic seat post as claimed in claim 2, wherein the installation portion has an accommodating space; the closing set comprises a positioning member installed in the accommodating space and fastened to the bottom end of the pneumatic cylinder, and a cover closing up a bottom end opening of the installation portion; said one of the elastic supporter and the rigid supporter is removably installed between the positioning member and the cover.

4. The telescopic seat post as claimed in claim 3, wherein the outer tube has a tube body; the tube body is formed at a bottom end thereof with the installation portion; an inner wall surface of the installation portion has a first stair portion; the positioning member has a positioning stair portion; the positioning stair portion is abutted against the first stair portion.

5. The telescopic seat post as claimed in claim 4, wherein an inner wall surface of the outer tube has an embedding recess; the positioning member has an embedding protrusion; the embedding protrusion is embedded in the embedding recess.

6. The telescopic seat post as claimed in claim 3, wherein the outer tube has a tube body, and a coupling pipe removably fastened to a bottom end of the tube body to become the installation portion; an inner wall surface of the installation portion has a second stair portion; the positioning member has a positioning stair portion; the positioning stair portion is abutted against the second stair portion.

7. The telescopic seat post as claimed in claim 3, wherein the closing set has a fastener; the fastener is fastened between the bottom end of the pneumatic cylinder and the positioning member.

8. The telescopic seat post as claimed in claim 3, wherein the elastic supporter is a compressible elastomer; an end of the elastomer is abutted against the positioning member; another end of the elastomer is abutted against the cover.

9. The telescopic seat post as claimed in claim 8, wherein the cover is screwingly engaged with the installation portion in a way that the elastomer is applied with a preload by the cover screwingly engaged with the installation portion for a depth.

10. The telescopic seat post as claimed in claim 3, wherein the elastic supporter comprises a compressible elastomer, and a gas filled in the elastomer; an end of the elastomer is abutted against the positioning member; another end of the elastomer is abutted against the cover.

11. The telescopic seat post as claimed in claim 10, wherein the closing set comprises a nozzle installed on the cover; the nozzle communicates with the gas in the elastomer.

12. The telescopic seat post as claimed in claim 2, wherein the installation portion has an accommodating space; the closing set comprises a positioning member installed in the accommodating space and fastened to the bottom end of the pneumatic cylinder, and a cover closing up a bottom end opening of the installation portion; a gas is filled between the positioning member and the cover to become the elastic supporter.

13. The telescopic seat post as claimed in claim 12, wherein the closing set has a fastener; the fastener is fastened between the bottom end of the pneumatic cylinder and the positioning member.

14. The telescopic seat post as claimed in claim 12, wherein the outer tube has a tube body; the tube body is formed at a bottom end thereof with the installation portion; an inner wall surface of the installation portion has a first stair portion; the positioning member has a positioning stair portion; the positioning stair portion is abutted against the first stair portion.

15. The telescopic seat post as claimed in claim 14, wherein an inner wall surface of the outer tube has an embedding recess; the positioning member has an embedding protrusion; the embedding protrusion is embedded in the embedding recess.

16. The telescopic seat post as claimed in claim 12, wherein the outer tube has a tube body, and a coupling pipe removably fastened to a bottom end of the tube body to become the installation portion; an inner wall surface of the installation portion has a second stair portion; the positioning member has a positioning stair portion; the positioning stair portion is abutted against the second stair portion.

17. The telescopic seat post as claimed in claim 2, wherein the installation portion has an accommodating space; the closing set comprises a positioning member installed in the accommodating space and fastened to the bottom end of the pneumatic cylinder; the rigid supporter has a body portion, and a bottom portion connected with the body portion to serve as a cover closing up a bottom end opening of the installation portion.

18. The telescopic seat post as claimed in claim 17, wherein the outer tube has a tube body; the tube body is formed at a bottom end thereof with the installation portion; an inner wall surface of the installation portion has a first stair portion; the positioning member has a positioning stair portion; the positioning stair portion is abutted against the first stair portion.

19. The telescopic seat post as claimed in claim 18, wherein an inner wall surface of the outer tube has an embedding recess; the positioning member has an embedding protrusion; the embedding protrusion is embedded in the embedding recess.

20. The telescopic seat post as claimed in claim 17, wherein the outer tube has a tube body, and a coupling pipe removably fastened to a bottom end of the tube body to become the installation portion; an inner wall surface of the installation portion has a second stair portion; the positioning member has a positioning stair portion; the positioning stair portion is abutted against the second stair portion.

* * * * *